(12) United States Patent
Duis et al.

(10) Patent No.: US 9,690,115 B2
(45) Date of Patent: Jun. 27, 2017

(54) CONTACT LENSES DISPLAYING REDUCED INDOOR GLARE

(75) Inventors: Donnie J. Duis, Jacksonville, FL (US); John R. Buch, Jacksonville, FL (US); Holly L. Grammer, Ponte Vedra Beach, FL (US); Eric R. George, St. Augustine, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 1022 days.

(21) Appl. No.: 13/082,427

(22) Filed: Apr. 8, 2011

(65) Prior Publication Data

US 2011/0249234 A1    Oct. 13, 2011

Related U.S. Application Data

(60) Provisional application No. 61/323,438, filed on Apr. 13, 2010.

(51) Int. Cl.
G02C 7/00 (2006.01)
G02C 7/04 (2006.01)
G02C 7/10 (2006.01)

(52) U.S. Cl.
CPC .............. *G02C 7/04* (2013.01); *G02C 7/046* (2013.01); *G02C 7/102* (2013.01); *G02C 7/108* (2013.01)

(58) Field of Classification Search
USPC ........... 351/159.24, 359.65, 359.66; 359/601
See application file for complete search history.

(56) References Cited

U.S. PATENT DOCUMENTS

| | | | |
|---|---|---|---|
| 3,034,403 A | 5/1962 | Neefe | |
| 3,808,178 A | 4/1974 | Gaylord | |
| 4,120,570 A | 10/1978 | Gaylord | |
| 4,136,250 A | 1/1979 | Mueller | |
| 4,139,513 A | 2/1979 | Tanaka | |
| 4,139,692 A | 2/1979 | Tanaka | |
| 4,153,641 A | 5/1979 | Deichert | |
| 4,182,822 A | 1/1980 | Chang | |
| 4,189,546 A | 2/1980 | Deichert | |
| 4,254,248 A | 3/1981 | Friends | |
| 4,259,467 A | 3/1981 | Keogh | |
| 4,260,725 A | 4/1981 | Keogh | |
| 4,261,875 A | 4/1981 | LeBoeuf | |

(Continued)

FOREIGN PATENT DOCUMENTS

| CA | 1099546 A1 | 4/1981 |
|---|---|---|
| CN | 1914028 A | 6/2005 |

(Continued)

OTHER PUBLICATIONS

Flanagan, Michael, et al. "Effect of Wavelength on Discomfort Glare From Monochromatic Sources." UMTRI-89-30; The Universit of Michigan. Ann Arbor, MI: Transportation Research Institute, 1989. Print.

(Continued)

*Primary Examiner* — Ricky Mack
*Assistant Examiner* — R. Tallman

(57) ABSTRACT

The present invention relates to contact lenses which reduce indoor glare and provide improved comfort to the wearer. The contact lenses of the present invention have, at about body temperature, a percent transmission between 70 to 90% across the region of 420-700 nm.

19 Claims, 6 Drawing Sheets

(56) References Cited

U.S. PATENT DOCUMENTS

| | | |
|---|---|---|
| 4,276,402 A | 6/1981 | Chromecek |
| 4,301,012 A | 11/1981 | Puckett |
| 4,327,203 A | 4/1982 | Deichert |
| 4,330,383 A | 5/1982 | Ellis |
| 4,341,889 A | 7/1982 | Deichert |
| 4,343,927 A | 8/1982 | Chang |
| 4,355,147 A | 10/1982 | Deichert |
| 4,450,264 A | 5/1984 | Cho |
| 4,463,149 A | 7/1984 | Ellis |
| 4,486,577 A | 12/1984 | Mueller |
| 4,495,313 A | 1/1985 | Larsen |
| 4,525,563 A | 6/1985 | Shibata |
| 4,543,398 A | 9/1985 | Bany |
| 4,576,453 A | 3/1986 | Borowsky |
| 4,605,712 A | 8/1986 | Mueller |
| 4,661,575 A | 4/1987 | Tom |
| 4,669,834 A * | 6/1987 | Richter .............. 351/159.24 |
| 4,680,336 A | 7/1987 | Larsen |
| 4,681,412 A | 7/1987 | Lemelson |
| 4,703,097 A | 10/1987 | Wingler |
| 4,707,236 A | 11/1987 | Borowsky |
| 4,711,943 A | 12/1987 | Harvey, III |
| 4,725,277 A | 2/1988 | Bissonette |
| 4,731,079 A | 3/1988 | Stoy |
| 4,837,289 A | 6/1989 | Mueller |
| 4,863,464 A | 9/1989 | Dusek |
| 4,871,785 A | 10/1989 | Froix |
| 4,872,876 A | 10/1989 | Smith |
| 4,889,664 A | 12/1989 | Kindt-Larsen |
| 4,952,046 A * | 8/1990 | Stephens et al. ......... 351/159.6 |
| 4,954,586 A | 9/1990 | Toyoshima |
| 4,954,587 A | 9/1990 | Mueller |
| 4,973,493 A | 11/1990 | Guire |
| 4,997,897 A * | 3/1991 | Melpolder .................. 526/284 |
| 5,010,141 A | 4/1991 | Mueller |
| 5,034,461 A | 7/1991 | Lai |
| 5,039,459 A | 8/1991 | Kindt-Larsen |
| 5,057,578 A | 10/1991 | Spinelli |
| 5,070,215 A | 12/1991 | Bambury |
| 5,115,056 A * | 5/1992 | Mueller et al. ............. 526/243 |
| 5,135,297 A | 8/1992 | Valint, Jr. |
| 5,235,358 A | 8/1993 | Mutzhas |
| 5,275,838 A | 1/1994 | Merrill |
| 5,314,960 A | 5/1994 | Spinelli |
| 5,336,797 A | 8/1994 | McGee |
| 5,346,946 A | 9/1994 | Yokoyama |
| 5,358,995 A | 10/1994 | Lai |
| 5,371,147 A | 12/1994 | Spinelli |
| 5,387,632 A | 2/1995 | Lai |
| 5,433,898 A | 7/1995 | Thakrar |
| 5,451,617 A | 9/1995 | Lai |
| 5,486,579 A | 1/1996 | Lai |
| 5,617,154 A | 4/1997 | Hoffman |
| 5,645,767 A * | 7/1997 | Van Gemert ................ 252/586 |
| 5,710,302 A | 1/1998 | Kunzler |
| 5,714,557 A | 2/1998 | Kunzler |
| 5,760,100 A | 6/1998 | Nicolson |
| 5,776,999 A | 7/1998 | Nicolson |
| 5,779,943 A | 7/1998 | Enns |
| 5,789,461 A | 8/1998 | Nicolson |
| 5,807,944 A | 9/1998 | Hirt |
| 5,846,457 A * | 12/1998 | Hoffman ...................... 264/2.1 |
| 5,849,811 A | 12/1998 | Nicolson |
| 5,908,906 A | 6/1999 | Kunzler |
| 5,919,880 A | 7/1999 | Imafuku |
| 5,944,853 A | 8/1999 | Molock |
| 5,958,440 A | 9/1999 | Burrell |
| 5,962,548 A | 10/1999 | Vanderlaan |
| 5,965,631 A | 10/1999 | Nicolson |
| 5,981,615 A | 11/1999 | Meijs |
| 5,981,675 A | 11/1999 | Valint, Jr. |
| 5,998,498 A | 12/1999 | Vanderlaan |
| 6,017,121 A | 1/2000 | Chateau |
| 6,020,445 A | 2/2000 | Vanderlaan |
| 6,039,913 A | 3/2000 | Hirt |
| 6,087,415 A | 7/2000 | Vanderlaan |
| 5,760,100 B1 | 11/2000 | Nicolson |
| 5,776,999 B1 | 11/2000 | Nicolson |
| 5,789,461 B1 | 11/2000 | Nicolson |
| 5,849,811 B1 | 11/2000 | Nicolson |
| 6,193,369 B1 | 2/2001 | Valint, Jr. |
| 6,200,626 B1 | 3/2001 | Grobe, III |
| 6,213,604 B1 | 4/2001 | Valint, Jr. |
| 6,224,210 B1 | 5/2001 | Chateau |
| 6,305,801 B1 | 10/2001 | Kerns, Jr. |
| 6,811,257 B1 | 11/2004 | Lehat |
| 7,261,844 B2 | 8/2007 | Tanikawa |
| 7,364,291 B2 * | 4/2008 | Haywood et al. .......... 351/159.6 |
| 7,553,880 B2 | 6/2009 | Nicolson |
| 7,556,750 B2 | 7/2009 | Xiao |
| 7,560,056 B2 * | 7/2009 | Van Gemert et al. ........ 264/1.32 |
| 7,717,556 B1 | 5/2010 | Walker |
| 7,931,369 B2 | 4/2011 | Harris |
| 2002/0080451 A1 | 6/2002 | Hughes |
| 2003/0103188 A1 | 6/2003 | Zeltzer |
| 2003/0142267 A1 * | 7/2003 | Gemert et al. ............ 351/160 R |
| 2005/0128433 A1 * | 6/2005 | Jahnke ........................ 351/162 |
| 2005/0221105 A1 * | 10/2005 | Quinn et al. .................. 428/500 |
| 2005/0237484 A1 * | 10/2005 | Ocampo ..................... 351/162 |
| 2005/0243272 A1 * | 11/2005 | Mainster et al. ........ 351/160 R |
| 2006/0226401 A1 | 10/2006 | Xiao |
| 2008/0186448 A1 | 8/2008 | Ishak |
| 2008/0221674 A1 * | 9/2008 | Blum et al. .................. 623/5.11 |
| 2008/0235047 A1 * | 9/2008 | Broderick et al. .................. 705/1 |
| 2009/0072206 A1 * | 3/2009 | Kim et al. ..................... 252/586 |
| 2010/0010123 A1 | 1/2010 | Fujie |
| 2010/0048847 A1 | 2/2010 | Broad |
| 2010/0057202 A1 | 3/2010 | Bogaert |
| 2012/0075577 A1 | 3/2012 | Ishak |

FOREIGN PATENT DOCUMENTS

| | | |
|---|---|---|
| CN | 101479646 A | 4/2008 |
| EP | 1054269 B1 | 5/2008 |
| EP | 2098192 A1 | 9/2009 |
| FR | 2664991 A1 | 1/1992 |
| GB | 2305256 A | 4/1997 |
| JP | 63-264719 A | 11/1988 |
| JP | 03107121 A | 5/1991 |
| JP | 05-070770 A | 3/1993 |
| JP | 09136902 A | 5/1997 |
| JP | 09-272814 A | 10/1997 |
| JP | 10-503764 A | 4/1998 |
| JP | 63163321 A | 7/1998 |
| JP | 2007537492 A | 12/2005 |
| JP | 2008-511026 A | 4/2008 |
| JP | 2009-543137 A | 12/2009 |
| JP | 2010-511205 A | 4/2010 |
| TW | 328116 | 3/1998 |
| WO | WO 9927978 A1 | 6/1999 |
| WO | WO 9929750 A1 | 6/1999 |
| WO | WO 0022459 A1 | 4/2000 |
| WO | WO 0022460 A1 | 4/2000 |
| WO | WO 0026698 A1 | 5/2000 |
| WO | WO 0026698 A8 | 5/2000 |
| WO | WO 0150182 A | 7/2001 |
| WO | WO 03011551 A1 | 2/2003 |
| WO | WO 03022321 A2 | 3/2003 |
| WO | WO 03022321 A3 | 3/2003 |
| WO | WO 2005058587 A2 | 6/2005 |
| WO | WO 2005058587 A3 | 6/2005 |
| WO | WO 2008003012 A2 | 1/2008 |
| WO | WO 2008003012 A3 | 1/2008 |
| WO | WO 2008061992 A2 | 5/2008 |
| WO | WO 2008061992 A3 | 5/2008 |
| WO | WO 2010068541 A1 | 6/2010 |

OTHER PUBLICATIONS

Wilkins, Arnold Jonathan, and Bruce J.W. Evans. "Visual stress, its treatment with spectral filters, and its relationship to visually induced motion sickness," *Applied Ergornomics*. 41. (2010): 509-515, Print.

(56) References Cited

OTHER PUBLICATIONS

Wolffsohn, James S., Olivia A. Hunt, and Ashock Chowdhury. "Objective, clinical performance of 'comfort-enhanced' daily disposable soft contact lenses." *Contact Lens & Anterior Eye.* 33, (2010): 88-92, Print.

Purslow, Christine, and James S. Wolffsohn. "Ocular Surface Temperature." *Eye & Contact Lens.* 31.3 (2005): 117-123, Print.

Abadi, Richard V., "The spectral transmittance of hydrogel contact lens filters." University of Manchester Institute of Science and Technology. Manchester, UK: University of Manchester, 1989. Print.

Billmeyer, Jr., F. W., and Max Saltzman. *Principles of Color Technology.* 2nd. New York, NY: John Wiley and Sons, 1981, 47-52. Print.

"Liquid Crystals",D. Demus and H. Sackman, New York; Gordon and Breach 1967. Print.

Green, Floyd J. *The Sigma-Aidrich Handbook of Stains, Dyes, and Indicators.* Aldrich Chemical Company, Inc., 1990. Print.

PCT International Search Report, dated Jun. 7, 2011, for PCT Int'l Appln. No. PCT/US2011/031879.

Turygin, Applied Optics, "Machine Engineering", 1965, p. 131.

\* cited by examiner

CONTACT LENSES DISPLAYING REDUCED INDOOR GLARE

RELATED APPLICATIONS

This application claims priority to provisional U.S. Patent Application Ser. No. 61/323,438, filed Apr. 13, 2010.

FIELD OF THE INVENTION

This invention relates to contact lenses displaying reduced indoor glare and improved visual comfort as well as methods of their production, and use.

BACKGROUND OF THE INVENTION

Contact lenses have been used commercially to improve vision since the 1950s. Contact lenses are currently available in a range of materials and millions of people wear contact lenses as their primary mode of optical correction.

Spectacle and contact lenses which block substantial amounts (greater than 80%, and often greater than 90%) have been disclosed. Sunglasses, for example, block substantial quantities of UV and visible light. UV absorbing contact lenses also substantially block UV light, but provide nearly 100% transmission in the visible light range so the contact lenses can be worn in all lighting conditions.

Contact lenses which selectively block specific wavelengths of light have been disclosed for a variety of purposes, including blocking blue wavelengths of light to prevent or retard cataract formation. Contact lenses tinted to improve handling or provide a cosmetic effect have also been disclosed. Photochromic contact lenses have also been disclosed to be useful for reducing glare and light intensity in bright sunlight.

In the past decade computers have become ubiquitous in offices, schools and homes. Extended periods of computer use can cause eye strain, and, in contact lens wearers additional discomfort and dryness as people tend to blink less when reading and working on the computer. Thus, there remains a need for contact lenses which remain comfortable during long periods of wear, especially while working indoors under artificial lights and/or on computers.

DETAILED DESCRIPTION OF THE INVENTION

Figure 1:
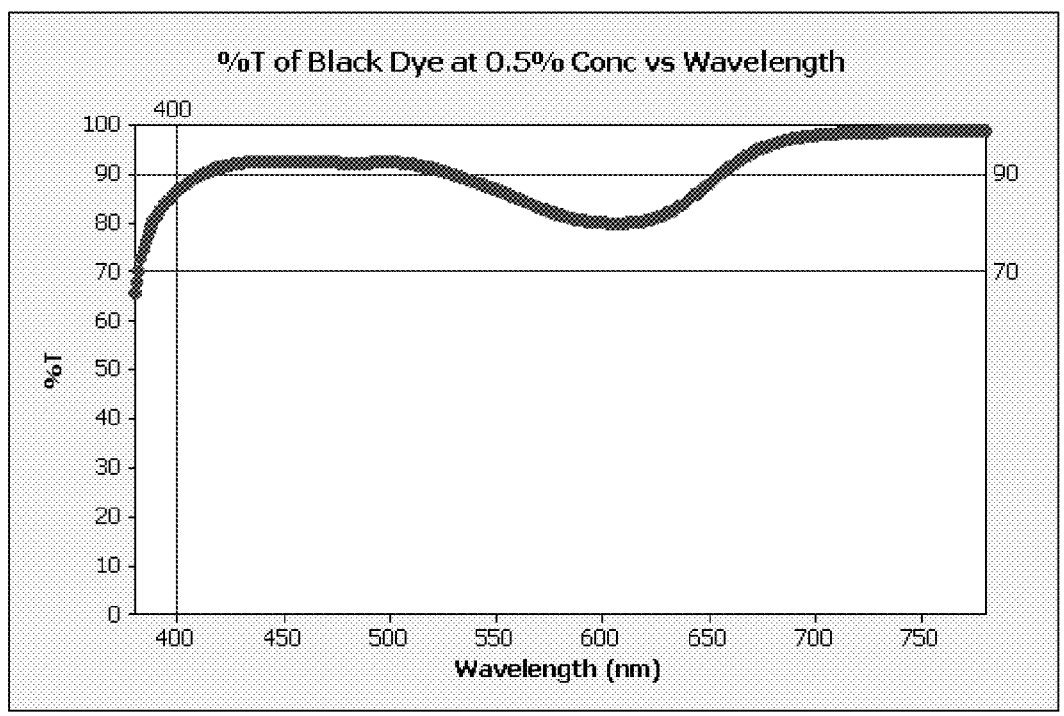
FIG. 1 is the absorbance spectrum for reactive Black Dye 5 at a 0.5 wt % concentration.
Figure 2:
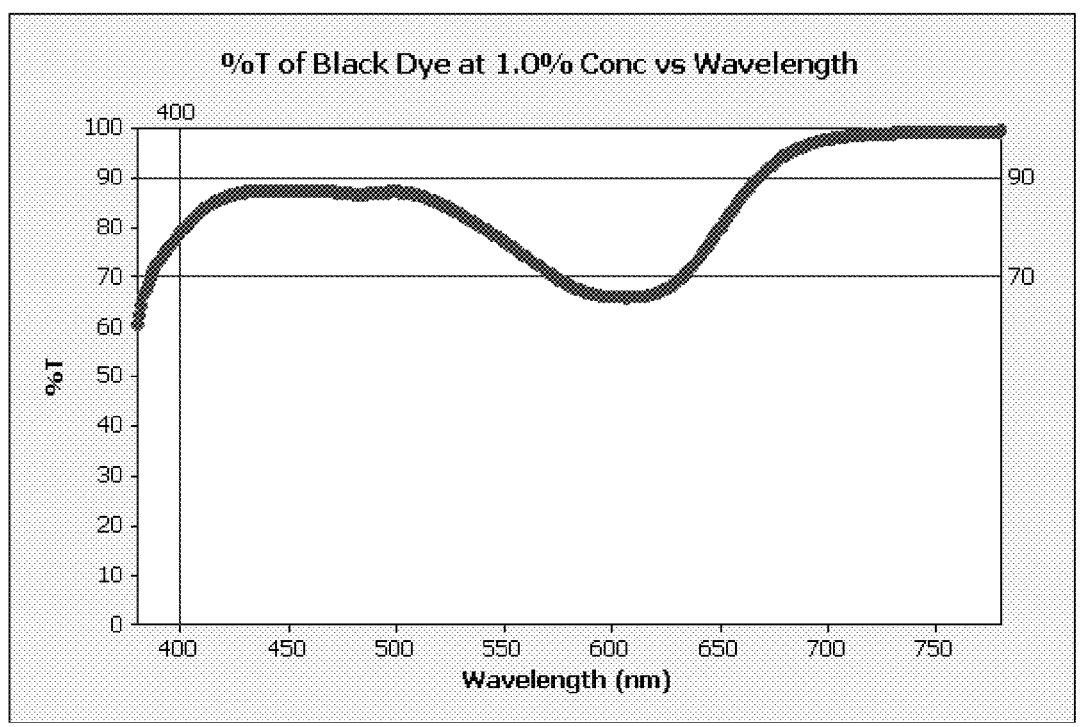
FIG. 2 is the absorbance spectrum for reactive Black Dye 5 at a 1 wt % concentration.
Figure 3:
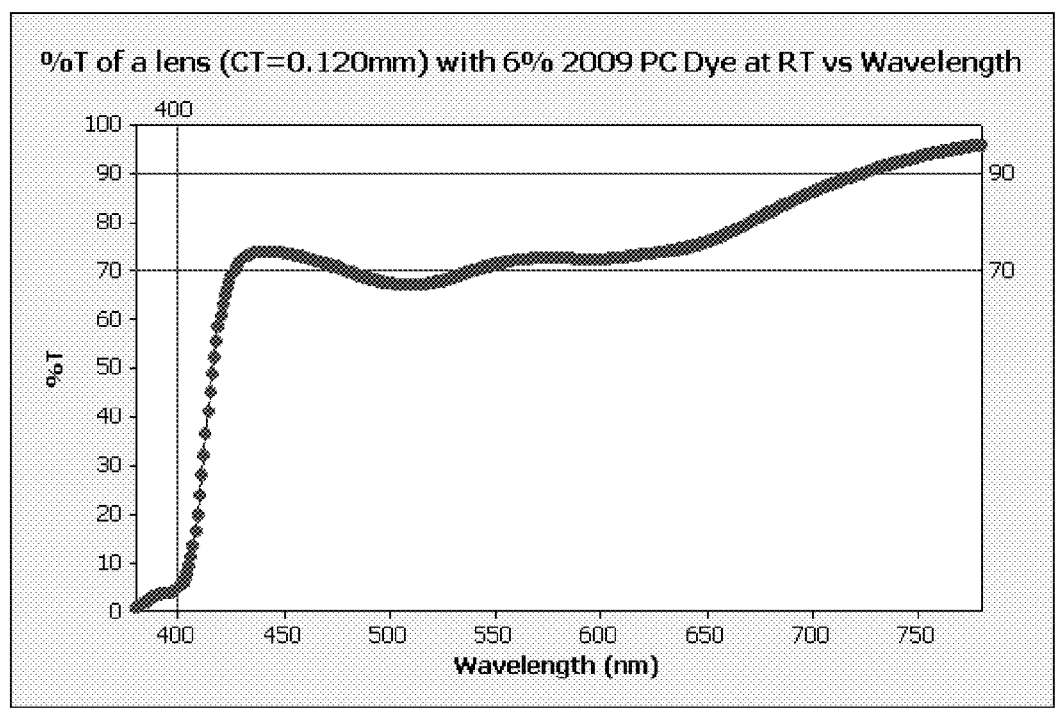
FIG. 3 shows the transmission spectra at room temperature for the photochromic dye used in Example 2.
Figure 4:
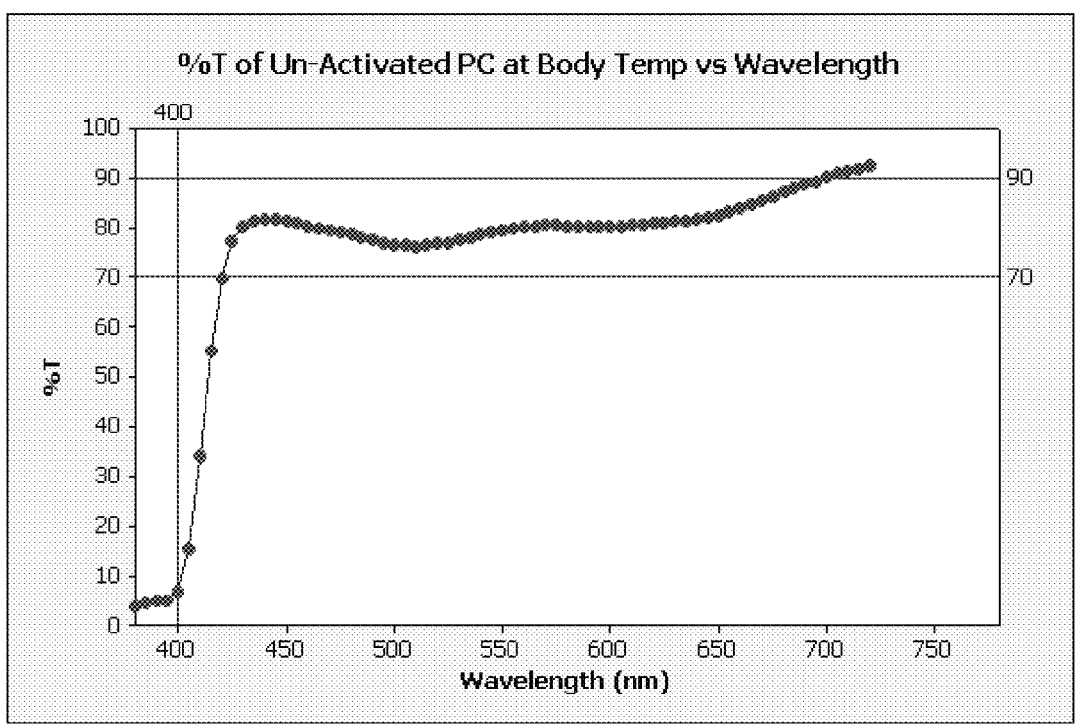
FIG. 4 shows the transmission spectra at eye temperature for the photochromic dye used in Example 2.

As used herein, the term "contact lens" refers to ophthalmic devices that reside on the eye. These devices can provide optical correction, wound care, drug delivery, diagnostic functionality, cosmetic enhancement or effect or a combination of these properties. The term lens includes but is not limited to soft contact lenses and hard contact lenses.

The term "eye temperature" refers to the temperature of the ocular environment, and is the temperature at which a contact lens would equilibrate while being worn. Generally eye temperature is between about 33 to about 38° C.

As used herein, the word "about" includes minor deviations from the recited numerical range, such as standard deviations which might be observed when measuring multiple samples in a test method.

This invention relates to contact lenses which reduce glare and ocular discomfort caused by indoor sources of glare such as computers and fluorescent lights.

The invention further provides contact lenses, and methods for their manufacture, that have percent transmission, at eye temperature, of between 70 to 90% across the region of 420 to 700 nm. In other embodiments the contact lenses display percent transmissions between about 75 and about 90% transmission across the region of 420 to 700 nm and in other embodiments between about 80 and about 90% transmission across the region of 420 to 700 nm. In yet another embodiment the contact lenses display the above disclosed percent transmission ranges across the region of 390 to 700 nm, 450 to 700 nm, and in another embodiment across the region of 450 to 660 nm. In another embodiment the contact lenses of the present invention display percent transmissions of at least about 70% in the range of about 390 to about 420 nm in addition to the percent transmission profile specified above.

In one embodiment the contact lenses comprise a central circular area centered at a geometric center of the lens and having a diameter of about 1 to about 9 mm and a peripheral zone, wherein said central circular area has, at eye temperature, the percent transmission ranges described above. In yet another embodiment, the central circular area has a diameter between about 4 and about 9 mm and in another embodiment between about 6 to about 9 mm. Percent transmissions within the recited ranges is important to insure that the ability to perceive and distinguish colors is not diminished. Percent transmission is measured using a light source in the visible region, generally in the range from 400 to about 700 nm. UV light should be excluded, as the measurement should reflect the transmission achieved when the lenses are worn indoors, such as in the presence of fluorescent or incandescent light. Specifically, percent transmission for contact lenses may be determined using the method described in Example 1.

It is a discovery of the invention that, by contact lenses which provide percent transmissions in the disclosed ranges reduce ocular glare and strain caused by computers and artificially lighting, but do not otherwise degrade visual acuity either at indoor or reduced lighting (such as night driving) conditions.

In another embodiment it has been found that contact lenses which provide percent transmissions in the disclosed ranges provide reduced ocular glare and strain experienced during night driving conditions. In yet another embodiment the contact lenses of the present invention reduce ocular glare and strain caused by computers and artificially lighting, and do not substantially degrade the perception of color by the contact lens wearer. In yet another embodiment the contact lenses of the present invention reduce the photostress recovery time of the eye after exposure to bright light. Photostress recovery time is the time it takes for the human eye to return to normal or baseline visual acuity after exposure to a bright light. It can be measured by directing a bright light from an ophthalmoscope onto the macula for 10 seconds. Photostress recovery time (PSRT) is the time it takes for the patient to read the line just above his/her pre-test best acuity line backwards.

In one embodiment, the invention provides a contact lens at least one surface of which comprises, consists essentially of or consists of an optic zone having a central circular area and a peripheral area, wherein the central circular has percent transmission, at eye temperature, of between about 70 to about 90% across the region of 420 to 700 nm and the peripheral area is capable of substantially blocking the transmittance of UV light, blue light, or both.

By "substantially blocking the transmittance" means that the transmittance of light is less than about 50%, in some embodiments less than about 20% and in other embodiments less than about 10%.

By "ultraviolet light" or "UV light" is meant light having a wavelength of about 100 to about 400 nm. By "blue light" is meant light having a wavelength of about 400 to about 515 nm.

The term "dye" as used herein includes any compound or mixture of compounds which absorbs radiation at least one wavelength and temperature. The dyes may be reactive or unreactive.

In one embodiment the dye has neutral hue. For example, a neutral gray color exhibits a spectrum that has relatively equal absorption in the visible range between 400 and 700 nanometers. An alternative way of describing color is in terms of its chromaticity coordinates, which describe the qualities of a color in addition to its luminance factor, i.e., its chromaticity. In the CIE system, the chromaticity coordinates are obtained by taking the ratios of the tristimulus values to their sum, e.g., x=X/(X+Y+Z) and y=Y/(X+Y+Z). Color as described in the CIE system can be plotted on a chromaticity diagram, usually a plot of the chromaticity coordinates x and y. See pages 47-52 of Principles of Color Technology; by F. W. Billmeyer, Jr., and Max Saltzman, Second Edition, John Wiley and Sons, New York (1981). As used herein, a near neutral color is one in which the chromaticity coordinate values of "x" and "y" for the color are within the following ranges (D65 illuminant): x=0.260 to 0.400, y=0.280 to 0.400.

The central circular area within the optic zone that contains the central circular light blocking region may be the same size as the optic zone, which in a typical contact lens is about 9 mm or less in diameter. In one embodiment, the central circular area has a diameter of between about 4 and about 9 mm and in another between about 6 and about 9 mm in diameter.

The central circular area may be composed of any suitable material or combination of materials, that blocks light transmission across the region of 420 to 700 nm to the desired degree. In one embodiment, the central circular area is solid colored, or tinted. In another embodiment the central circular area is solid, but the % transmission varies across the central circular area. For example, in one embodiment the % transmission increases from the center of the central circular area to its edge, providing a graduated, or feathered effect. In an alternative embodiment, the central circular area and rings are composed of opaque dots sized and spaced apart to provide the desired light transmission blocking. In another embodiment the central circular area may comprise concentric rings, such as disclosed in U.S. Pat. No. 7,364,291. Any effect may be used, so long as the herein disclosed level of light transmission is achieved.

In another embodiment the either the central circular area, or the entire lens, may comprise at least one dye which is incorporated throughout the polymer matrix in that area. The dye may be incorporated by any known means including entrapping or reacting the dye in the polymer from which the lens is made, or imbibing the dye into a least a portion of the lens.

Suitable dyes include, without limitation, photochromic compounds, thermochromic compounds including but not limited to leuco dyes and liquid crystals, pigments, conventional dyes and combinations thereof and the like.

Examples of liquid crystals include cholesteryl nonanoate and cyanobiphenyls. Additional examples are disclosed in "Liquid Crystals", D. Demus and H. Sackman, Gordon and Breach 1967. Examples of leuco dyes include spirolactones (such as crystal violet lactone), fluorans, spiropyrans, fulgides in combination with weak acids such as bisphenol A, parabens, 1,2,3-triazole derivates, and 4-hydroxycoumarin and combinations thereof. The liquid crystals and leuco dyes may be incorporated into polymerizable mixtures as microcapsules.

Examples of polymerizable colorants such as acryloxy or methacryloxy-substituted 2,4-dihydroxybenzophenonic compounds and non-polymerizable colorants such as 2,2',4, 4'-tetrhyroxybenzophenone and 2,2'-dihyroxy-4,4'-dimethoxybenzophenone. Additional colorants include, without limitation, 4-[(2,4-dimethylphenyl)azo]-2,4-dihydro-5-methyl-2-phenyl-3H-pyrazol-3-on-e, 1,4-bis[(4-methylphenyl)amino]-9,10-anthracendione, and 1, hydroxyl-4-[(4-methylphenyl)amino]-9,10-anthracenedione and combinations thereof.

As yet another alternative, reactive dyes may be used. Suitable such dyes include, without limitation, benzene sulfonic acid, 4-(4,5-duhyro-4-((2-methoxy-5-methyl-4-((2-(sulfooxy)ethyl)sulfonyl)pheny 1)azo-3-methyl-5-oxo-1H-orazol-1-yl, [2-mephtahlenesulfonic acid, 7-(acetylamino)-4-hydroxyl-3-((4-sulfooxyethyl)sulfonyl)phenyl)azo], {5-((4,6-dichloro-1,3,5,-triazin-2-yl)amino-4-hydroxy-3-((1-sulfon-2-neph-thal enyl_azo-2,7-naphtahlene-disulfonic acid, trisodium salt], copper, 29H, 31H-phthalocyaninato (2-)-N.sub.29,N.sub.30,N.sub.31,N.sub.32)-sulfo(-(4-((2-sulfooxy)ethyl)sulfonyl)phenyl)amino)sulfonyl derivative, [2,7-napthalenesulfonic acid, 4-amino-5-hydroxy-3,6-bis ((4-((2-(sulfooxy)ethyl)sulfonyl)phenyl)azo)tetrasodium salt, and combinations thereof.

Still another alternative is to include at least one organic or inorganic pigment suitable for use in contact lenses, or combinations of such pigments. Illustrative organic pigments include, without limitation, pthalocyanine blue, pthalocyanine green, carbazole violet, vat orange #1, and the like and combinations thereof. Examples of useful inorganic pigments include, without limitation, iron oxide black, iron oxide brown, iron oxide yellow, iron oxide red, titanium dioxide, and the like, and combinations thereof. In addition to these pigments, soluble and non-soluble dyes may be used including, without limitation, dichlorotriazine and vinyl sulfone-based dyes. Useful dyes and pigments are commercially available. Combinations of dyes and pigments may also be used to achieve the desired percent transmission.

The dye selected may be combined with one or more of a reaction mixture, pre-polymer, or binding polymer, and optional solvent(s) to form the colorant used to produce the light absorbing layers or regions used in the lenses of the invention. The contact lenses of the present invention may also include contain multiple layers of dyes. Other additives useful in contact lens also may be used. The binding polymers, solvents, and other additives useful in the light absorbing layer(s) or regions of the invention are known and either commercially available or methods for their making are known.

In another embodiment, the lens or the central circular area may comprise a photochromic compound or composition, which compounds and compositions are well known. The photochromic materials include, without limitation, the following classes of materials: chromenes, such as naphthopyrans, benzopyrans, indenonaphthopyrans and phenanthropyrans; spiropyrans, such as spiro (benzindoline) naphthopyrans, spiro (indoline) benzopyrans, spiro (indoline)

naphthopyrans, spiro (indoline) quinopyrans and spiro (indoline) pyrans; oxazines, such as spiro (indoline) naphthoxazines, spiro (indoline) pyridobenzoxazines, spiro (benzindoline) pyridobenzoxazines, spiro (benzindoline) naphthoxazines and spiro (indoline) benzoxazines; mercury dithizonates, fulgides, fulgimides and mixtures of such photochromic compounds. In one embodiment the contact lenses of the present invention contain dyes other than 1,3-dihydro-1,3,3, trimethylspiro[2H-indole-2,3'[3H]naphth[2,1-b][1,4]oxazine] or 1',3'-dihydro-1',3',3'-trimethyl-6-nitrospiro[2H-1-benzopyran-2,2'(2H)-indole].

Additional suitable photochromic materials include, without limitation, organo-metal dithiozonates, such as (arylazo)-thioformic arylhydrazidates, e.g., mercury dithizonates; and fulgides and fulgimides, naphthoxazines, spirobenzopyrans; polymerizable spirobenzopyrans and spirobenzopyrans; polymerizable fulgides; polymerizable naphthacenediones; polymerizable spirooxazines; and polymerizable polyalkoxylated napthopyrans. The photochromic materials may be used alone or in combination with one or more other appropriate and complementary photochromic materials.

Still other useful photochromic materials include indeno-fused naphthopyrans, which are more specifically disclosed in US2009/0072206 and US2006/0226401 and those cited in U.S. Pat. No. 7,364,291, and combinations thereof. Other suitable photochromic compounds are disclosed in U.S. Pat. No. 7,556,750, the disclosure of which is incorporated by reference. Non-limiting examples of suitable photochromic dyes include Formula I

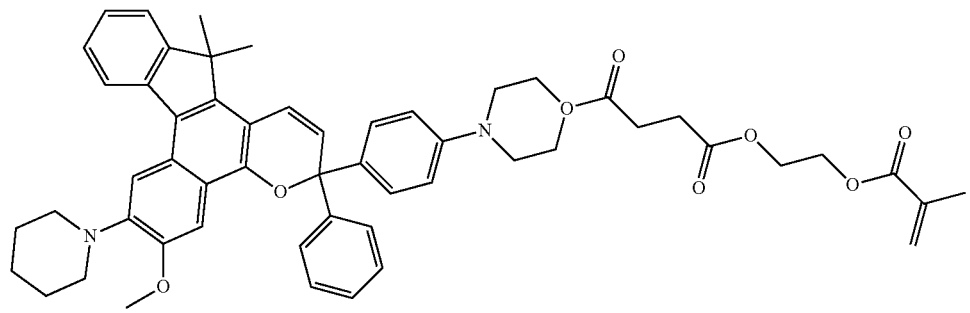

Formula II

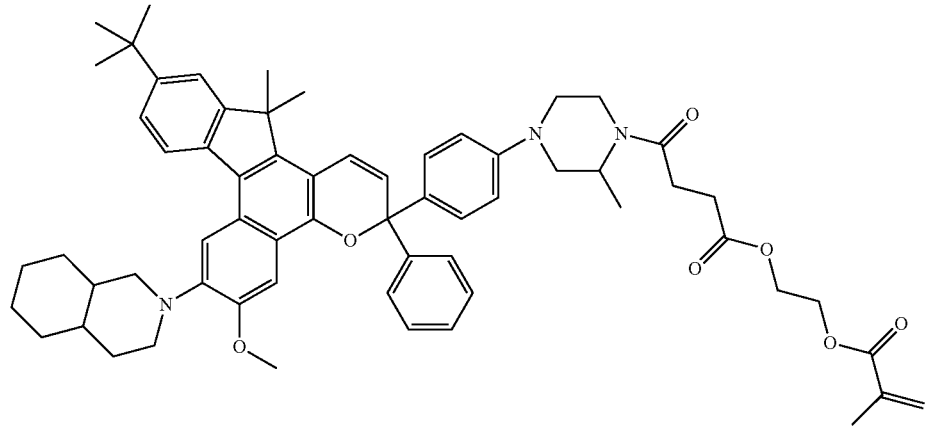

Formula III

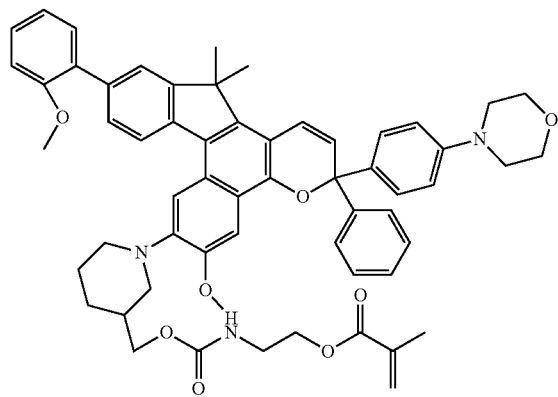

Formula IV

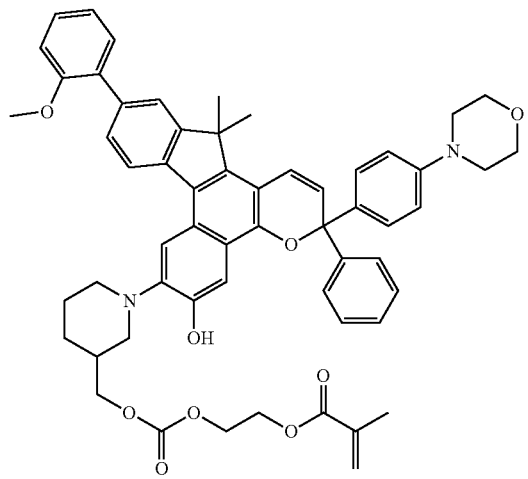

As used herein "an indoor glare reducing effective amount" of dye an amount effective to achieve the desired reduction in percent transmission across the herein disclosed wavelength ranges. Mixtures of dyes may be readily used. For example, in an embodiment where a photochromic compound is selected, a conventional dye or pigment may also be included achieve the desired transmission range across the desired wavelength range. So for example, if a photochromic showed greater than 90% transmission above about 600 nm, a spectral dye, such as Basic Blue 66 (CAS No. 94233-04-2), Indocyanine Green (CAS No. 3599-32-4), Methylene Blue (CAS No 61-73-4) absorbing in that wavelength could be added in a concentration to provide between about 70 to about 90% transmission. These and other dyes, are listed, along with their spectra, in "The Sigma-Aldrich Handbook of Stains, Dyes, and Indicators", Floyd J. Green, Aldrich Chemical Company, Inc., 1990. Alternatively, a leuco dye, such as but not limited to those included in U.S. Pat. No. 5,919,880 could be included.

The particular amount used also will depend upon the coloring strength of the selected dye(s), the lens material selected as well as the thickness of the lens.

In some embodiments either the central circular area, the peripheral zone, or the entire lens may also block UV light. In these embodiments the % transmission of UV light can be less than about 20%, and in some embodiments less than about 10%. Both UV-A and UV-B light may be blocked. It will be appreciated that in these embodiments where a photochromic compound is used, dyes which absorb in the activating wavelengths for the photochromic dye may interfere with the activation of the photochromic dye and should be minimized or avoided in the zone where the photochromic is included.

In one embodiment, the peripheral zone of the contact lenses blocks light in selected regions. For example, the peripheral region may block UV light, blue light, or a combination of the two. In one embodiment the peripheral zone has a % transmission in the UV range of less than about 20%, and in some embodiments less than about 10%. In another embodiment, the peripheral zone is capable of substantially blocking the transmittance of UV, blue light or both.

The contact lenses of the present invention may have center thicknesses of between about 50 and about 200 microns.

The invention may be used to provide hard or soft contact lenses made of any known lens material, or material suitable for manufacturing such lenses. In one embodiment, the lenses of the invention are soft contact lenses having water contents of about 0 to about 90 percent, and in another embodiment between about 20 and about 75% water. In yet another embodiment the contact lenses of the present invention have a water content of at least about 25%. The lenses of the present invention may also have other desirable properties, including a tensile modulus of less than about 200 psi, in some embodiments less than about 150 psi and in other embodiments less than about 100 psi. The lenses may further have oxygen permeabilities of greater than about 50 psi, and in some embodiments greater than about 100 psi. It should be understood that combinations of the foregoing properties are desirable, and the above referenced ranges may be combined in any combination.

The lenses may be made of hydrophilic components, silicone-containing components and mixtures thereof to form polymers such as siloxanes, hydrogels, silicone hydrogels, and combinations thereof. Material useful for forming the lenses of the invention may be made by reacting blends of macromers, monomers, polymers and combinations thereof along with additives such as polymerization initiators. Suitable materials include, without limitation, silicone hydrogels made from silicone macromers and hydrophilic monomers.

Examples of soft contact lenses formulations include but are not limited to the formulations of etafilcon A (poly-HEMA, methacrylic acid copolymer), genfilcon A, lenefilcon A, polymacon (polyHEMA), acquafilcon A, balafilcon A, galyfilcon A, senofilcon A, lotrafilcon A and B, comfilcon, narafilcon, filcon II 3, asmofilcon A and the like. The preferable contact lens formulations are formed from polymers in the families etafilcon, balafilcon, acquafilcon, lotrafilcon, comfilcon, galyfilcon, senofilcon, narafilcon, filcon II 3, asmofilcon A, as well as silicone hydrogels, as prepared in U.S. Pat. No. 5,998,498, WO03/22321, U.S. Pat. No. 6,087,415, U.S. Pat. No. 5,760,100, U.S. Pat. No. 5,776,999, U.S. Pat. No. 5,789,461, U.S. Pat. No. 5,849,811, U.S. Pat. No. 5,965,631, U.S. Pat. No. 7,553,880, WO2008/061992, US2010/048847. These patents as well as all other patent disclosed in this paragraph are hereby incorporated by reference in their entirety.

In one embodiment the contact lenses of the present invention are formed from silicone hydrogel formulations. A silicone-containing component is one that contains at least one [—Si—O—Si] group, in a monomer, macromer or prepolymer. Preferably, the Si and attached O are present in the silicone-containing component in an amount greater than 20 weight percent, and more preferably greater than 30 weight percent of the total molecular weight of the silicone-containing component. Useful silicone-containing components preferably comprise polymerizable functional groups such as acrylate, methacrylate, acrylamide, methacrylamide, N-vinyl lactam, N-vinylamide, and styryl functional groups. Examples of silicone components which may be included in the silicone hydrogel formulations include, but are not limited to silicone macromers, prepolymers and monomers. Examples of silicone macromers include, without limitation, mono or difunctional polydimethylsiloxanes, polydimethylsiloxane methacrylated with pendant hydrophilic groups as described in U.S. Pat. Nos. 4,259,467; 4,260,725 and 4,261,875; polydimethylsiloxane macromers with polymerizable functional group(s) described in U.S. Pat. Nos. 4,136,250; 4,153,641; 4,189,546; 4,182,822; 4,343,927; 4,254,248; 4,355,147; 4,276,402; 4,327,203; 4,341,889; 4,486,577; 4,605,712; 4,543,398; 4,661,575; 4,703,097; 4,837,289; 4,954,586; 4,954,587; 5,346,946; 5,358,995; 5,387,632; 5,451,617; 5,486,579; 5,962,548; 5,981,615; 5,981,675; and 6,039,913; polysiloxane macromers incorporating hydrophilic monomers such as those described in U.S. Pat. Nos. 5,010,141; 5,057,578; 5,314,960; 5,371,147 and 5,336,797; macromers comprising polydimethylsiloxane blocks and polyether blocks such as those described in U.S. Pat. Nos. 4,871,785 and 5,034,461, combinations thereof and the like. All of the patents cited herein are hereby incorporated in their entireties by reference.

The silicone and/or fluorine containing macromers described in U.S. Pat. Nos. 5,760,100; 5,776,999; 5,789, 461; 5,807,944; 5,965,631 and 5,958,440 may also be used.

Suitable silicone monomers include tris(trimethylsiloxy)silylpropyl methacrylate, hydroxyl functional silicone containing monomers, such as 3-methacryloxy-2-hydroxypropyloxy)propylbis(trimethylsiloxy)methylsilane and those disclosed in WO03/22321, and mPDMS containing components or the siloxane monomers described in U.S. Pat. Nos. 4,120,570, 4,139,692, 4,463,149, 4,450,264, 4,525,563; 5,998,498; 3,808,178; 4,139,513; 5,070,215; 5,710,302; 5,714,557 and 5,908,906.

Additional suitable siloxane containing monomers include, amide analogs of TRIS described in U.S. Pat. No. 4,711,943, vinylcarbamate or carbonate analogs described in U.S. Pat. No. 5,070,215, and monomers contained in U.S. Pat. No. 6,020,445, monomethacryloxypropyl terminated polydialkylsiloxanes, and in some embodiments monomethacryloxypropyl terminated polydimethylsiloxanes which are terminated with C1-C6 alkyls, polydimethylsiloxanes, 3-methacryloxypropylbis(trimethylsiloxy)methylsilane, methacryloxypropylpentamethyl disiloxane and combinations thereof.

Hard contact lenses are made from polymers that include but are not limited to polymers of poly(methyl)methacrylate, silicon acrylates, silicone acrylates, fluoroacrylates, fluoroethers, polyacetylenes, and polyimides, where the preparation of representative examples may be found in U.S. Pat. No. 4,330,383. Intraocular lenses of the invention can be formed using known materials. For example, the lenses may be made from a rigid material including, without limitation, polymethyl methacrylate, polystyrene, polycarbonate, or the like, and combinations thereof. Additionally, flexible materials may be used including, without limitation, hydrogels, silicone materials, acrylic materials, fluorocarbon materials and the like, or combinations thereof. Typical intraocular lenses are described in WO 0026698, WO 0022460, WO 9929750, WO 9927978, WO 0022459, U.S. Pat. Nos. 4,301,012; 4,872,876; 4,863,464; 4,725,277; 4,731,079.

Hydrophilic monomers may be incorporated into such copolymers, including 2-hydroxyethyl methacrylate ("HEMA"), 2-hydroxyethyl acrylate, N,N-dimethylacrylamide ("DMA"), N-vinylpyrrolidone, 2-vinyl-4,4-dimethyl-2-oxazolin-5-one, methacrylic acid, and 2-hydroxyethyl methacrylamide.

The lenses may be coated to increase their compatibility with living tissue. Therefore, the lenses of the inventions may be coated with a number of agents that are used to coat lens. For example, the coating procedures, compositions, and methods of WO03/11551, U.S. Pat. Nos. 6,087,415, 5,779,943, 5,275,838, 4,973,493, 5,135,297, 6,193,369, 6,213,604, 6,200,626, and 5,760,100 may be used and these applications and patents are hereby incorporated by reference for those procedures, compositions, and methods.

The central circular area may be applied to, or printed on, one or more surfaces of a lens or may be printed onto one or more surfaces of a mold into which a lens forming material will be deposited and cured. In one method for forming lenses incorporating the designs of the invention, a thermoplastic optical mold, made from any suitable material including, without limitation, cyclic polyolefins and polyolefins such as polypropylene, polystyrene resin, cycloolefin-based polymers such as TOPAS, which is an amorphous copolymer based on cycloolefins and ethylene, commercially available from Ticona, polymers made by ring-opening metathesis polymerization of norbornene compounds followed by hydrogenation, such as Zeonor, which is commercially available from Zeon Corporation, glass, metal, or quartz may be used. The central circular area is deposited onto the desired portion of the molding surface of the mold. By "molding surface" is meant the surface of a mold or mold half used to form a surface of a lens. The deposition may be carried out by microdosing spraying, pad printing, tampo printing, brushing or stamping.

In one embodiment the deposition is carried out by microdosing according to the procedure describe in PCT/US2010/020959, filed Jan. 14, 2010.

The contact lenses of the invention may be prepared by mixing reactive components and any diluent(s) with a polymerization initator and curing by appropriate conditions to form a product that can be subsequently formed into the appropriate shape by lathing, cutting and the like. Alternatively, the reaction mixture may be placed in a mold and subsequently cured into the appropriate article.

Various processes are known for processing the lens formulation in the production of contact lenses, including spincasting and static casting. In one embodiment the contact lenses of this invention are prepared by molding. For this method, the lens formulation is placed in a mold having the shape of the final desired lens, and the lens formulation is subjected to conditions whereby the components polymerize, to produce a lens. The lens may be treated with a solvent to remove the diluent and ultimately replace it with water. This method is further described in U.S. Pat. Nos. 4,495,313; 4,680,336; 4,889,664; and 5,039,459, incorporated herein by reference. The preferred method of curing is with radiation, preferably UV or visible light, and in some embodiments with visible light.

In order to illustrate the invention the following examples are included. These examples do not limit the invention. They are meant only to suggest a method of practicing the invention. Those knowledgeable in contact lenses as well as other specialties may find other methods of practicing the invention. However, those methods are deemed to be within the scope of this invention.

EXAMPLES

The following abbreviations were used in the examples
Blue HEMA the reaction product of reactive blue number 4 and HEMA, as described in Example 4 or U.S. Pat. No. 5,944,853
CGI 1850 1:1 (w/w) blend of 1-hydroxycyclohexyl phenyl ketone and bis (2,6-dimethyoxybenzoyl)-2,4-4-trimethylpentyl phosphine oxide
DI water deionized water
D3O 3,7-dimethyl-3-octanol
DMA N,N-dimethylacrylamide
TEGDMA tetraethyleneglycol dimethacrylate
HEMA hydroxyethyl methacrylate
IPA Isopropyl alcohol
mPDMS mono-methacryloxypropyl terminated polydimethylsiloxane (MW 800-1000)
Norbloc 2-(2'-hydroxy-5-methacrylyloxyethylphenyl)-2H-benzotriazole PC-1 photochromic compound of Formula I
PC-2 photochromic compound of Formula II
ppm parts per million micrograms of sample per gram of dry lens
PVP polyvinylpyrrolidinone (K 90)
Simma 2 3-methacryloxy-2-hydroxypropyloxy)propylbis(trimethylsiloxy)methylsilane
TEGDMA tetraethyleneglycol dimethacrylate Example 1

A reaction mixture was formed from the components listed in Table 1 and diluent (D30) (77 wt % components: 23 wt % D30) (Reactive Mixture 1). A reactive photochromic compound of Formula 1 (3.2% based upon the weight of the reactive components) was added to Reactive mixture 1. The reaction mixture was mixed together with stirring or rolling for at least about 3 hours at about 23° C., until all components were dissolved. The reaction mixture was placed into thermoplastic contact lens molds (made from Zeonor (commercially available from Zeon Corporation) front curve molds and polypropylene back curve), and irradiated using Philips TL 20W/03T fluorescent bulbs above and below the lens molds and the following conditions: about 1 minute at about 1 mW/sec$^2$ at ambient temperature, about 7 minutes at 2 mW/sec$^2$ and 80° C. and about 4 minutes at 5.5. mW/sec$^2$ and 80° C. All curing was done in $N_2$. The molds were opened and lenses were extracted into a 70:30 (wt) solution of IPA and DI $H_2O$ at ambient temperature for at least 60 minutes. The IPA:DI water solution was exchanged twice, and soaked in IPA:DI water at ambient temperature for at least about 30 minutes for each additional exchange to remove residual diluent and monomers, placed into deionized $H_2O$ for about 30 minutes, then equilibrated in borate buffered saline for at least about 24 hours and autoclaved at 122° C. for 30 minutes.

The percent transmission was measured using a Perkin Elmer Lambda 45 UV/VIS scanning Spectrometer (double monochromator system) or equivalent, interfaced to a PC and operating software using the following methodology. Background correction was performed to balance the response of the instrument over the entire spectral range measured such that noise, non-linearities, and minor absorbances due to unmatched cuvettes, lens holders, etc. can be accounted for and removed from the actual data. The lens is placed flat on a round lens holder and clipped on the oval back without stretching the lens and minimizing wrinkles. The lens holder is placed in a quartz cuvette filled to overflowing with packing solution. The outside of the cuvette is dried completely and any smudges are removed. The cuvette is oriented in the instrument with the front curve of the lens facing the sample beam.

TABLE 1

| Component | Wt % |
| --- | --- |
| SiGMA | 28 |
| PVP (K90) | 7 |
| DMA | 24 |
| mPDMS | 31 |
| HEMA | 6 |
| Norbloc | 2 |
| CGI 1850 | 0.48 |
| TEGDMA | 1.5 |
| Blue HEMA | 0.02 |

PC1 has the following structure:

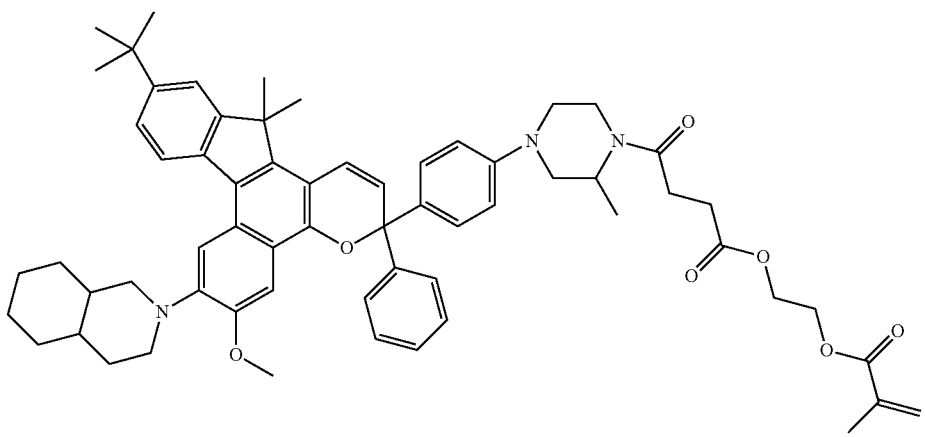 [SMILES: C=C(C)C(=O)OCCOC(=O)CCC(=O)N1CCN(c2ccc(C3(c4ccccc4)C=Cc4c5c(c6cc(N7CCC8CCCCC8C7)c(OC)cc6c4O3)-c3ccc(C(C)(C)C)cc3C5(C)C)cc2)CC1C]

The lenses of Example 1 were evaluated in a 41 patient clinical study. The study was a bilateral, subject-masked, dispensing, crossover evaluation conducted over three (3) scheduled visits. Subjects were initially fitted (according to the randomization scheme provided by the biostatistician) with either a senofilcon A spherical lens (commercially available from Johnson & Johnson Vision Care, Inc.) (as a control), or a lens of Example 1. At the first follow-up visit after 5 to 7 days of wear, subjective responses, general fitting characteristics (including movement and centration) and physiological response to the first lens were measured. The subjective responses collected included ability to see comfortably in bright and indoor light, reduction of glare in bright outdoor and indoor light and reduction of eye strain. The responses were collected on a five box scale (excellent, very good, good, fair, poor). The other study lens was then fitted and dispensed similar to the first study lens and follow-up occurred in the same manner followed by a final evaluation.

A summary of the results of the "top two box" (excellent, very good) responses is shown in Table 2, below.

| Visual Attribute | Ex. 1 (%) | Control (%) |
| --- | --- | --- |
| Clarity of vision indoors in bright light | 66 | 59 |
| Clarity of vision in dim light | 59 | 59 |

-continued

| Visual Attribute | Ex. 1 (%) | Control (%) |
|---|---|---|
| Reduction in glare caused by bright indoor lights | 51 | 32 |
| Reduction of glare from computer | 54 | 32 |
| Reduction of eyestrain from computer | 56 | 41 |
| Color contrast outdoors | 54 | 59 |
| Color contrast indoors | 61 | 59 |

A majority of the subjects who participated in the clinical study found that the lenses of Example 1 were very good or excellent at reducing indoor glare, glare from computers and eye strain from computer use (51%, 54% and 56% respectively). These results were statistically better than the results reported for the control lenses (32%, 32% and 41%, respectively) which contained only a visibility tint. The data also show that the lenses of Example 1 provide the same clarity of vision in dim light (59% excellent/very good) as the control lens. Color contrast was also unaffected.

Example 2

Photochromic dye of Formula 1 (6 wt % based upon the weight of the reaction components of Reactive Mixture 1) and an additional 5% PVP was dissolved into Reactive Mixture 1 (shown in Table 1, above) to form a Dye Containing Reactive Mixture.

3 mg of the Dye Containing Reactive Mixture was dosed into the center of a Zeonor front curve lens mold. Next, 80 mg of Reactive Mixture 1 was dosed on top of the Dye Containing Reactive Mixture. A polypropylene base curve was then deposited and the molds were closed. The filled molds were irradiated using Philips TL 20W/03T fluorescent bulbs above and below the lens molds and the following conditions: about 1 minute at about 1 mW/sec$^2$ at ambient temperature, about 7 minutes at 2 mW/sec$^2$ and 80° C. and about 4 minutes at 5.5. mW/sec$^2$ and 80° C. All curing was done in N$_2$. The molds were opened and lenses were extracted into a 70:30 (wt) solution of IPA and DI H$_2$O at ambient temperature for at least 60 minutes. The IPA:DI water solution was exchanged twice, and soaked in IPA:DI water at ambient temperature for at least about 30 minutes for each additional exchange to remove residual diluent and monomers, placed into deionized H$_2$O for about 30 minutes, then equilibrated in borate buffered saline for at least about 24 hours and autoclaved at 122° C. for 30 minutes.

The study was a bilateral, subject-masked, dispensing, crossover evaluation conducted over three (3) scheduled visits. Subjects were initially fitted with either a senofilcon A spherical (20 patients completed) (commercially available from Johnson & Johnson Vision Care, Inc.) (as a control), or lenses of Example 2 (21 patients completed) according to the randomization scheme provided by the biostatistician. At the first follow-up visit after 6 to 9 days of wear, subjective responses, general fitting characteristics (including movement and centration) and physiological response to the first dispensed lens were measured. The subjective responses collected included ability to see comfortably in bright and indoor light, reduction of glare in bright outdoor and indoor light and reduction of eye strain. The responses were collected on a five box scale (Strongly agree, agree, neither agree nor disagree, disagree, strongly disagree). The other study lens was then fitted and dispensed similar to the first study lens and follow-up occurred in the same manner followed by a final evaluation.

A summary of the results of the "top two box" responses is shown in Table 5, below. The scoring system is such that higher scores denote better performance regardless of whether the question was asked negatively or positively. For questions asked positively, such as "I was very satisfied with the quality of my vision in bright light"—a high score indicates a high level of agreement (top two boxes strongly agree/agree), indicating good vision in bright light. For the question "I noticed a glare effect in bright light"—a high score indicates a high level of disagreement (top two boxes were strongly disagree, disagree), and therefore a reduced glare in bright light.

TABLE 5

| Visual Attribute | Ex. 4 (%) | Control (%) |
|---|---|---|
| "I was very satisfied with the quality of my vision in bright light" | 81 | 43 |
| "I was satisfied with the quality of my vision at night" | 86 | 72 |
| "With these lenses, I felt confident to drive at night" | 81 | 76 |
| "I noticed a glare effect in bright light" | 81 | 57 |
| "I was able to clearly view a computer screen" | 95 | 76 |
| "I experienced more headaches when using a computer" | 76 | 67 |

Examples 3-4

For each example the additional components listed in Table 3 were added to Reactive Mixture 1 in the amounts shown in Table 3, and dissolved to form a Dye Containing Reactive Mixture. For diluent, PVP and TEGDMA additional amount of those components were added as listed in Table 3.

TABLE 3

| Ex. # | Dye | [dye] (wt %) | [D3O] | [PVP] | [TEGDMA] |
|---|---|---|---|---|---|
| 3 | PC1 | 4.5 | 15 | 7 | 0 |
| 4 | PC2 | 4.4 | 0 | 3 | 0.5 |

PC1 - photochromic dye of Formula I
PC2 - photochromic dye of Formula II 3 mg of the Dye Containing Reactive Mixture was dosed into the center of a Zeonor front curve lens mold. Next, 80 mg of Reactive Mixture 1 was dosed on top of the Dye Containing Reactive Mixture. A polypropylene base curve was then deposited and the molds were closed. The filled molds were irradiated using Philips TL 20W/03T fluorescent bulbs above and below the lens molds and the following conditions: about 1 minute at about 1 mW/sec$^2$ at ambient temperature, about 7 minutes at 2 mW/sec$^2$ and 80° C. and about 4 minutes at 5.5. mW/sec$^2$ and 80° C. All curing was done in N$_2$. The molds were opened and lenses were extracted into a 70:30 (wt) solution of IPA and DI H$_2$O at ambient temperature for at least 60 minutes. The IPA:DI water solution was exchanged twice, and soaked in IPA:DI water at ambient temperature for at least about 30 minutes for each additional exchange to remove residual diluent and monomers, placed into deionized H$_2$O for about 30 minutes, then equilibrated in borate buffered saline for at least about 24 hours and autoclaved at 122° C. for 30 minutes.

Examples 5-7

Dye solutions were prepared as follows. Ambient temperature DI water (500 ml) was added to clean glass beakers.

Reactive Black 5 dye (commercially available from Organic Dyestuff Corporation) was added to each beaker in amounts sufficient to make the concentrations specified in Table 3, below. Tween 80 (polyoxyethylene (20) sorbitan monooleate, commercially available from ICI Americas, Inc.), (0.08 grams) was added to each beaker and the solutions were stirred until homogenous.

TABLE 3

| Example | [dye] (wt %) |
|---|---|
| CE 2 | 0 |
| Example 5 | 0.5% |
| Example 6 | 1% |
| Example 7 | 2% |

The Fixing solution was prepared as follows. Ambient temperature DI water (1000 ml) was added to a clean, glass beaker. Sodium hydroxide (50%) (5 gm) was added under stirring. Sodium chloride (10 gm) was added under stirring. Tween 80 (commercially available from ICI Americas, Inc.) (0.08 gm) was added under stirring and the solution was stirred until homogenous.

250 ml of the fixing solution was placed into each of 3 beakers. The black dye and fixing solutions were heated to about 55° C. Once the solutions reached about 55° C., 10 lenses mounted in the holders were added to each black dye solution with stirring, insuring that the holders remained completely submerged. The lenses were stirred in the dye solution for 60 minutes. The lenses in holders were removed from the dye solution and excess solution was removed. The lenses still mounted in the holders from each dye solution beaker were transferred to fixing solution with stirring. The lenses were stirred in the fixing solution for 30 minutes. The lenses in holders were removed from the fixing solution and excess fixing solution was removed. The lenses were removed from the holders, rinsed 3 times in D1 solution until all dye and fixing solution was removed and placed into vials with packing solution and sterilized lenses in vials with packing solution.

Utilizing this method with 0.5% dye in hydrating solution resulted in contact lenses displaying an average % T of about 90 from 400-780 nm. Increasing or decreasing dye concentration in the hydration process allows for adjustment in final % T. FIG. 1 shows the % T vs wavelength using this method with 0.5% dye in the hydrating solution.

Examples 8-11 and Comparative Example 1

Figure 5:
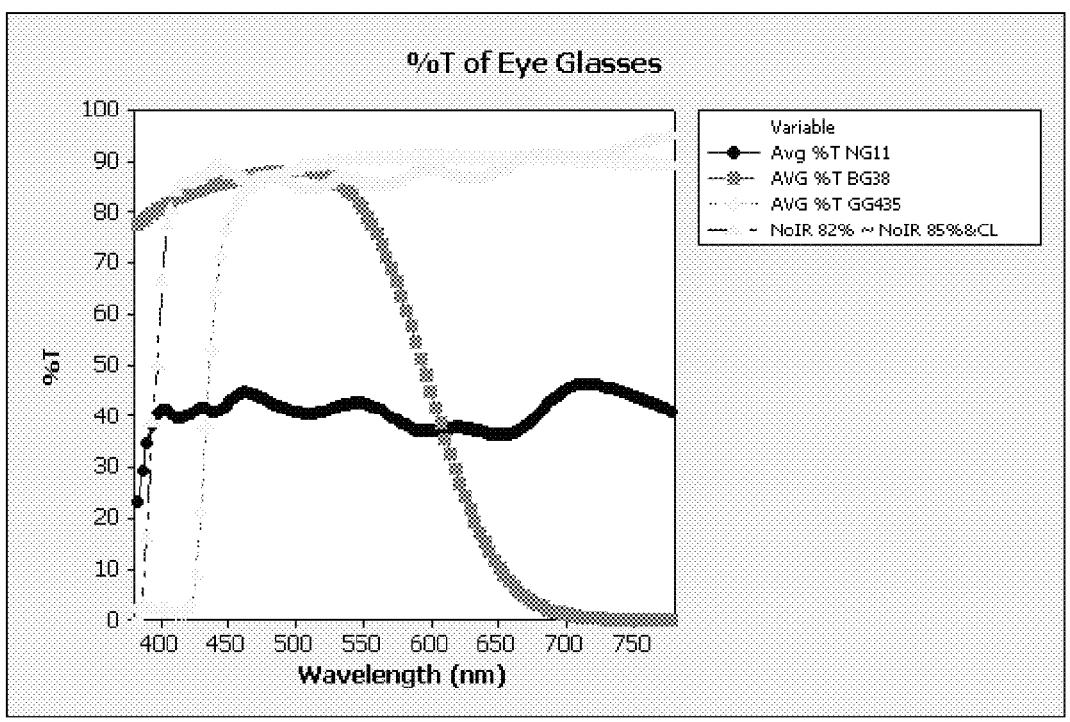
FIG. 5 show the transmission spectra for the colored lenses used in Examples 9-11.

A study was conducted to further confirm the transmission profile which provides improved indoor comfort. Additionally, maintenance of color perception was evaluated.
Seven habitual wearers of contact lenses were selected. Each subject wore ACUVUE® OASYS® habitually, or wore them for a least one day prior to the start of the study. At the first visit each subject completed a baseline questionnaire to assess their visual comfort while wearing contact lenses, primarily at a computer. The results are shown in Table 4. Each subject was then given a pair of spectacles fitted with one of 4 different spectral filters (optical-quality glass that were ground, tempered, and fit into a spectacle frame). Descriptions of the filters used are shown in Table 4, and the transmission spectra for each is shown in FIG. 5.
The subjects wore the spectacles for one day, then rated the spectacles using the same questionnaire which had been completed at the baseline visit.

Most subjects wore an additional three sets of glasses, for one day each and completed the questionnaire after each wear cycle.

A summary of the responses is shown in Table 5, below. The scoring system is such that higher scores denote better performance regardless of whether the question was asked negatively or positively. For questions asked positively, such as "I was very satisfied with the quality of my vision in bright light"—a high score indicates a high level of agreement (top two boxes strongly agree/agree), indicating good vision in bright light. For the question "I noticed a glare effect in bright light"—a high score indicates a high level of disagreement (top two boxes were strongly disagree, disagree), and therefore a reduced glare in bright light. A score of 3 indicates neutral/no opinion.

| n | Lens | Q1 | Q2 | Q3 | Q4 | Q5 | Q6 | Q7 | Q8 |
|---|---|---|---|---|---|---|---|---|---|
| 7 | Oasys | 4.1 | 3.6 | 3.1 | 3.7 | 3.1 | 3.0 | 3.1 | 4.4 |
| 7 | NG11 | 3.1 | 3.7 | 3.7 | 3.9 | 3.1 | 3.7 | 3.9 | 3.3 |
| 6 | GG435 | 4.0 | 4.2 | 3.7 | 4.5 | 3.7 | 4.3 | 4.0 | 3.2 |
| 6 | BG38 | 3.8 | 4.3 | 3.8 | 4.2 | 3.8 | 4.0 | 4.2 | 2.3 |
| 5 | NoIR85 | 4.0 | 4.2 | 4.0 | 4.4 | 4.0 | 4.2 | 4.0 | 5.0 |

Looking at the results for Examples 9 and 11, and FIG. 5, it can be seen that lenses which provide % transmissions of about 70 to about 90% across the wavelengths from 450 to about 700 nm were reported to provide significant improvements in reducing glare and strain. The spectacles of Example 9 however, did not allow patients to see true colors. Accordingly, where maintenance of color perception is desired in addition to improvements in indoor glare reduction, percent transmission of about 70 to about 90% across the range from 420 to about 660 are desirable.

Example 12

A clinical trial was conducted to confirm the percent transmission range providing improved comfort and glare reduction indoors.

Twenty-two subjects enrolled with 20 completing the study. The average age of the participants was 32. Seven were male and 13 were female. Baseline eligibility requirements were confirmed. All subjects were habitual soft contact lenses and were fitted with galyfilcon A contact lenses for the study at the initial study. At the initial visit, subjects were asked to provide information on their profession.

Figure 6:
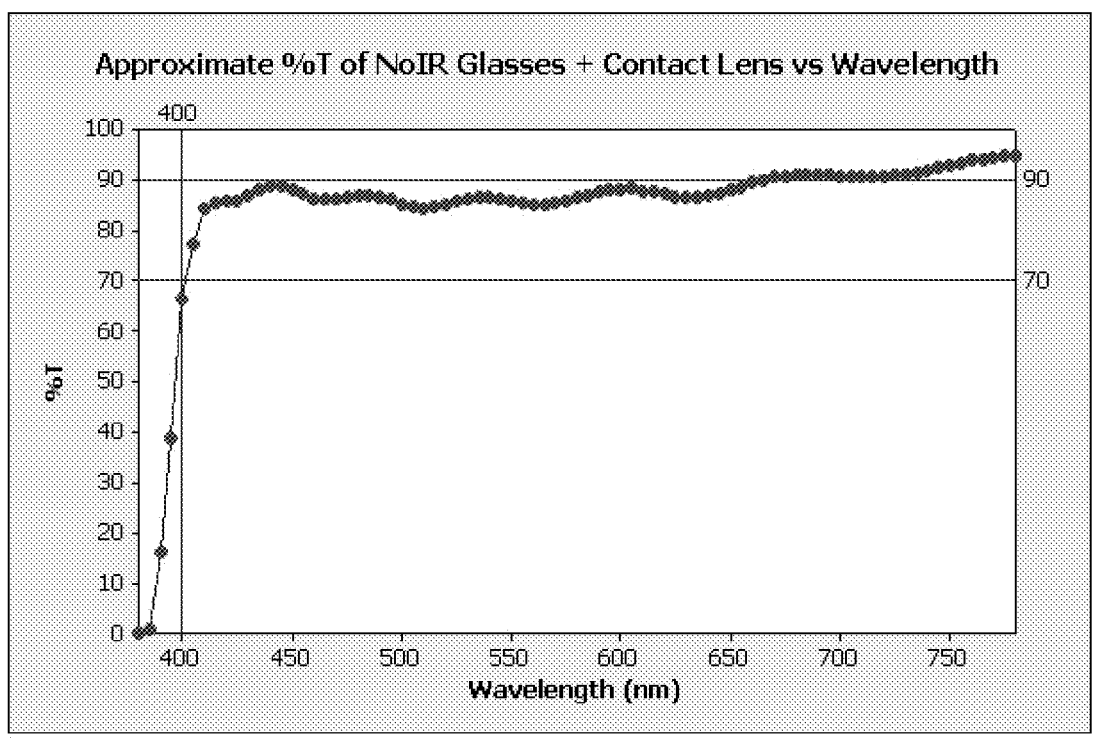
FIG. 6 shows the transmission spectra at room temperature for 82% T glasses used in Example 12.

At the initial visit and after fitting with galyfilcon A, each subject was asked to wear each of five glasses for an initial evaluation. The spectacles were manufactured by NoIR Medical Technologies (South Lyon, Mich.) that have been color-match to the PC-1, used in Example 1, at the following light transmission levels: 79%, 82%, 85%, 88% and 91%. These % transmission levels included both the spectacles and contact lenses. The contact lenses transmitted 97%, so for an overall target transmission of 85%, the spectacles were made to a % transmission of 88%. The frames had an 8 base curvature lens, and fit closely to the face of the subjects to minimize stray light. The percent transmission spectra for the 82% T lens is shown at FIG. 6.

During the initial evaluation and for each pair of glasses, the subjects performed three visual tasks, reading, computer use and watching television, for five minutes each. Each subject rated the glasses on a five point scale (1=strongly disagree, 5=strongly agree) by responding to the following questions:

Based on the darkness of these contact lenses and/or glasses, I was able to work at the computer/read a magazine/watch television with ease.

While working at the computer/reading a magazine/watching television the color of the contact lenses and/or glasses was acceptable.

The results were tabulated for each subject and the top three glasses as rated by that subject were dispensed. The subjects were instructed to wear the glasses during their usual indoor tasks.

Follow up visits were scheduled 1-3 days after the initial visit. Visual acuity and psysiology were assessed and each subject completed a questionnaire about the glasses containing the following questions.

Did wearing the sunglasses provide more visual comfort than just wearing contact lenses only?

When did you notice this benefit the most? For example: at the computer, reading a book, watching television, . . . . Please list all situations that apply.

The color of the sunglasses did not bother me AT ALL indoors.

Seventy percent (70%) of the subjects preferred the spectacles dispensed in the study to contact lenses alone. Ten out of the sixteen (16) subjects who listed comments noted that glasses provided more comfort than contact lenses alone when working at a computer. Five (5) out of the sixteen (16) subjects who listed comments noted that glasses provided more comfort than contact lenses alone when watching television. Subjects were split as to the optimal level of transmission, with 48% preferring glasses with less than 85% T and 40% preferring glasses with greater than 85% T.

What is claimed is:

1. A contact lens having, at about body temperature, a percent transmission between 70 to 90% across the region of 420-700 nm.

2. A contact lens comprising a central circular area centered at a geometric center of the lens and having a diameter of about 1 to about 9 mm and a peripheral zone, wherein said central circular area has, at body temperature, a percent transmission between 70 to 90% across the region of 450-660 nm.

3. The contact lens of claim 2 wherein said peripheral zone has a percent transmission in the UV range of less than about 20%.

4. The contact lens of claim 2 wherein said peripheral zone is capable of substantially blocking the transmittance of UV, blue light or both.

5. The contact lens of claim 2 wherein said peripheral zone is capable of blocking at least about 90% of the transmittance of UV light.

6. The contact lens of claim 2 wherein said central circular area has a diameter of between about 4 and about 9 mm.

7. The contact lens of claim 2 wherein said central circular area has a diameter of between about 6 and about 9 mm.

8. The contact lens of claim 1 or 2 wherein said contact lens comprises at least one dye in an indoor glare reducing effective amount.

9. The contact lens of claim 2 wherein said central circular area comprises dots comprising at least one dye in an indoor glare reducing effective amount.

10. The contact lens of claim 1 wherein said percent transmission is between about 75 to about 90% across the region of 420 to 700 nm.

11. The contact lens of claim 1 wherein said percent transmission is between about 80 and about 90% across the region of 420 to 700 nm.

12. The contact lens of claim 1 wherein said percent transmission is between about 75 to about 90% across the region of 450-660 nm.

13. The contact lens of claim 1 wherein said percent transmission is between about 80 and about 90% across the region of 450-660 nm.

14. A method for reducing indoor glare discomfort in contact lens wearers comprising applying to each eye of said contact lens wearer a contact lens having percent transmission at about body temperature between 70 to 90% across the region of 450-700 nm.

15. A method for reducing glare discomfort in contact lens wearers comprising applying to each eye of said contact lens wearer a contact lens comprising a central circular area centered at a geometric center of the lens and having a diameter of about 1 to about 9 mm and a peripheral zone, wherein said central circular area has, at body temperature, a percent transmission between about 70 to about 90% across the region of 420-700 nm.

16. The contact lens of claim 1 further comprising a circular area centered at a geometric center of the lens and having a diameter of about 1 to about 9 mm and a peripheral zone, and wherein said peripheral zone comprises a color print, iris pattern or a combination thereof.

17. The contact lens of claim 8 wherein said dye comprises at least one conventional colorant.

18. The contact lens of claim 1 wherein said contact lens is a hydrogel or silicone hydrogel contact lens.

19. The contact lens of claim 1 wherein said contact lens has a water content of at least about 25%.

\* \* \* \* \*